(12) United States Patent
Mitchell (10) Patent No.: US 6,308,976 B1
(45) Date of Patent: Oct. 30, 2001

(54) STEERABLE TRAILERS

(76) Inventor: George Wallace Mitchell, Foss Farm, Wilberfoss York, YO4 5NY (GB)

( * ) Notice: Subject to any disclaimer, the term of this patent is extended or adjusted under 35 U.S.C. 154(b) by 0 days.

(21) Appl. No.: 09/230,312

(22) PCT Filed: Jul. 24, 1997

(86) PCT No.: PCT/GB97/02008

§ 371 Date: Jan. 22, 1999

§ 102(e) Date: Jan. 22, 1999

(87) PCT Pub. No.: WO98/03387

PCT Pub. Date: Jan. 29, 1998

(30) Foreign Application Priority Data

Jul. 24, 1996 (GB) .................................................. 9615512

(51) Int. Cl.$^7$ .................................................. B62D 13/04
(52) U.S. Cl. .......................... 280/419; 280/426; 280/442; 280/98
(58) Field of Search .................................... 280/419, 426, 280/442, 443, 432, 91.1, 98, 99, 93.507, 93.501, 81.6, DIG. 9

(56) References Cited

U.S. PATENT DOCUMENTS

| | | | |
|---|---|---|---|
| 1,518,517 | * | 12/1924 | Jonkhoff . |
| 2,869,888 | * | 1/1959 | Burger . |
| 4,570,965 | * | 2/1986 | Caswell ................................. 280/426 |
| 5,207,443 | * | 5/1993 | Mitchell ................................. 280/98 |
| 5,477,937 | * | 12/1995 | Chagnon ............................. 280/81.6 |

* cited by examiner

Primary Examiner—Anne Marie Boehler (57) ABSTRACT

A multiple axle trailer is disclosed consisting of a main chassis articulated to a tractor unit and a sub-chassis relative to which the main chassis rotates on a turntable. The sub-chassis has a pair of forward wheel (3) and pair of rear wheels (4), each of which rotates on a stub axle and king pin assembly (6). A steering mounting has two swinging arms depending from the main chassis, joined at their free ends by a horizontal tie. A primary link of a linkage mechanism is coupled to the horizontal tie, the linkage mechanism coupling the wheels to the steering mounting such that rotation of the main chassis relative to the sub-chassis causes the stub axles to pivot about the king pins. Movement of the swinging arms causes the line of action of the primary link to cross the axis about which the main chassis rotates relative to the sub-chassis, reversing the direction of steer for when the trailer is backed up.

21 Claims, 12 Drawing Sheets

STEERABLE TRAILERS

FIELD OF THE INVENTION

This invention relates to multiple axle trailers and in particular to automatic steering mechanism for such trailers.

BACKGROUND TO THE INVENTION

It is known that to reduce tire and road wear, it is advantageous to provide steering mechanisms for multiple axle trailers. One example of such a mechanism is shown in U.S. Pat. No. 5,207,443. This is an example of a true four wheel steering mechanism in which each of four wheels on the trailer is independently steerable (i.e. pivotable relative to its associated axle) and which therefore allows optimum steering geometry to be selected. Other more primitive mechanisms exist, in which the wheels on only one axle are independently steerable, but these systems whilst offering a reduced turning circle still suffer from tire wear on the wheels which are not independently steerable and consequently give rise to road damage.

The mechanism disclosed in U.S. Pat. No. 5,207,443 steers the wheels using a linkage mechanism for each pair of wheels, operated by relative movement of a sub-chassis on which the wheels are mounted and a draw bar which is articulated to a tractor unit. As the tractor unit rounds a corner, the draw bar follows it, but the sub-chassis initially does not. Thus, the draw bar moves relative to the sub-chassis, activating the steering allowing the trailer to follow the tractor unit. This mechanism, although highly satisfactory in achieving four wheel steering, is somewhat complicated. This stems from the need to be able to reverse the direction in which the trailer wheels steer depending upon whether the trailer is being drawn or backed up by a tractor unit. To achieve this, a hydraulically activated device is used for each linkage mechanism, i.e. for each pair of steerable wheels.

The present invention is designed to address the problems outlined above and to provide a simplified reversible steering mechanism for a trailer having four independently steerable wheels.

SUMMARY OF THE INVENTION

Accordingly, the present invention provides a trailer comprising:

a main chassis adapted to be articulated to a tractor unit;

a sub-chassis relative to which the main chassis may rotate about a substantially vertical axis and including a laterally spaced pair of forward steerable wheels and a laterally spaced pair of rear steerable wheel, each such wheel being pivotable relative to the sub-chassis about a respective substantially vertical axis; and a linkage mechanism coupling each of the steerable wheels to a steering mounting on the main chassis such that rotation of the main chassis relative to the sub-chassis causes the wheels to pivot about their respective axes and including at least one primary link coupled at one end to the steering mounting;

the steering mounting being movable relative to the main chassis between a first position and a second position such that the line of action joining the two ends of each primary link crosses the axis about which the main chassis rotates relative to the sub-chassis.

As will become clear from the later description, the present invention allow the direction in which each of the steerable wheel pivots in response to movement of the main chassis relative to the sub-chassis to be reversed in one movement of the steering mounting. For example, when the steering mounting is in its first position, the line of action of any one primary link lies to one side of the axis about which the main chassis rotates relative to the sub-chassis. Thus, rotation of the main chassis relative to the sub-chassis will either push or pull on the primary link.

However, when the steering mounting is moved to its second position, the line of action of the primary link crosses the axis about which the main chassis rotates relative to the sub-chassis so as to lie on the other side. Thus, any rotation of the main chassis which, before the steering mounting was moved, pushed on the primary link, now pulls on the primary link. This is because the motion which the end of the primary link coupled to the steering mounting undergoes relative to the sub-chassis, when resolved along the line of action of the primary link, is opposite to that which it underwent before the steering housing was moved. Similarly, any rotation of the main chassis which, before the steering mounting was moved, pulled on the primary link, now pushes on the primary link. Thus, the direction of steering of each of the four wheels is reversed.

The path taken by the trailer will of course depend on the geometry of the steering mechanism. However, it will be understood that all four wheels are actively brought into the optimum position for following the towing vehicle when the trailer is drawn, or leading it when it is backing up.

The trailer according to the invention may make use of standard steering and suspension components. Thus, each such steerable wheel may rotate on a stub axle assembly adapted to pivot relative to the sub-chassis, e.g. on a king pin carried by the sub-chassis.

Each of the steerable wheels may be associated with a steering arm which pivots with the wheel (e.g. a steering arm on its corresponding stub axle assembly), with the steering arms of each pair of wheels or stub axle assemblies being linked by a track rod. Thus, conventional technology may be used to seat and adjust the steering geometry.

There are a number of ways in which the steering mounting may be coupled, via the primary link or links to the steerable wheels. For example, at least one primary link may couple the steering mounting directly to a steering arm of a respective pair of wheels or stub axle assemblies. This steering arm may the same as that to which the track rod attaches or may be a supplementary steering arm.

Alternatively, at least one primary link may couple the steering mounting directly to an intermediate coupling of a respective pair of wheels or stub axle assemblies, with the track rod of that pair of wheels or stub axle assemblies being in two parts, each part connecting a respective steering arm to the intermediate coupling. The intermediate coupling may be a bell crank mounted on the sub-chassis at a pivot point, with the lines of action of the primary link and of the track rod parts offset from the pivot point.

The linkage mechanism may include one primary link and a secondary link coupling a steering arm or the intermediate coupling of the pair of wheels or stub axle assemblies to which the primary link is coupled to a steering arm or intermediate coupling of the other pair of wheels or stub axle assemblies. Alternatively, the linkage mechanism may include a primary link for each pair of wheels or stub axle assemblies.

The movement of the steering mounting between its first and second positions may be in a vertical plane or a horizontal plane. Substantially horizontal movement may be provided by a steering mounting comprising a swinging arm suspended from and securely fixed to the main chassis, each primary link being coupled to the swinging arm. For example, the steering mounting may comprise two swinging arms suspended from the main chassis, joined at their free ends by a horizontal tie to form a parallelogram, each primary link being coupled directly to the horizontal tie. In either case, for maximum effect with minimum movement, the movement of the steering mounting is preferably substantially perpendicular to the line of action of each primary link.

Alternatively, the movement of the steering mounting may be in a horizontal plane. e.g. rotary movement. For example, the steering mounting may comprise a crank mounted on the main chassis at a pivot point and to which each primary link is directly coupled.

Use of the single, common steering mounting allows its movement to be controlled by just a single telescopic ram, hydraulic or pneumatic.

To spread the load of the chassis and any superstructure and payload, it is preferred that the main chassis and the sub-chassis have cooperating arcuate bearing surfaces which permit their relative rotation. These arcuate bearing surfaces may, for example be comprised in two halves of a turntable.

Advantageously the sub-chassis comprises the lower part of a turntable and the chassis includes the upper part of a turntable, the pivot point connecting the two parts of the turntable being located substantially centrally over the axles.

The linkages may include a track arm and track rod for each wheel of each pair, each track rod having a first end pivotally mounted to said mounting point and a second end pivotally mounted to is respective track arm.

The invention is applicable to trailers having more than two pairs of wheels and/or more than two pairs of steerable wheels, such as three- or four-axle trailers.

BRIEF DESCRIPTION OF THE DRAWINGS

The invention will now be described by way of example with reference to the accompanying drawings in which.

DETAILED DESCRIPTION OF THE INVENTION

Figure 1:
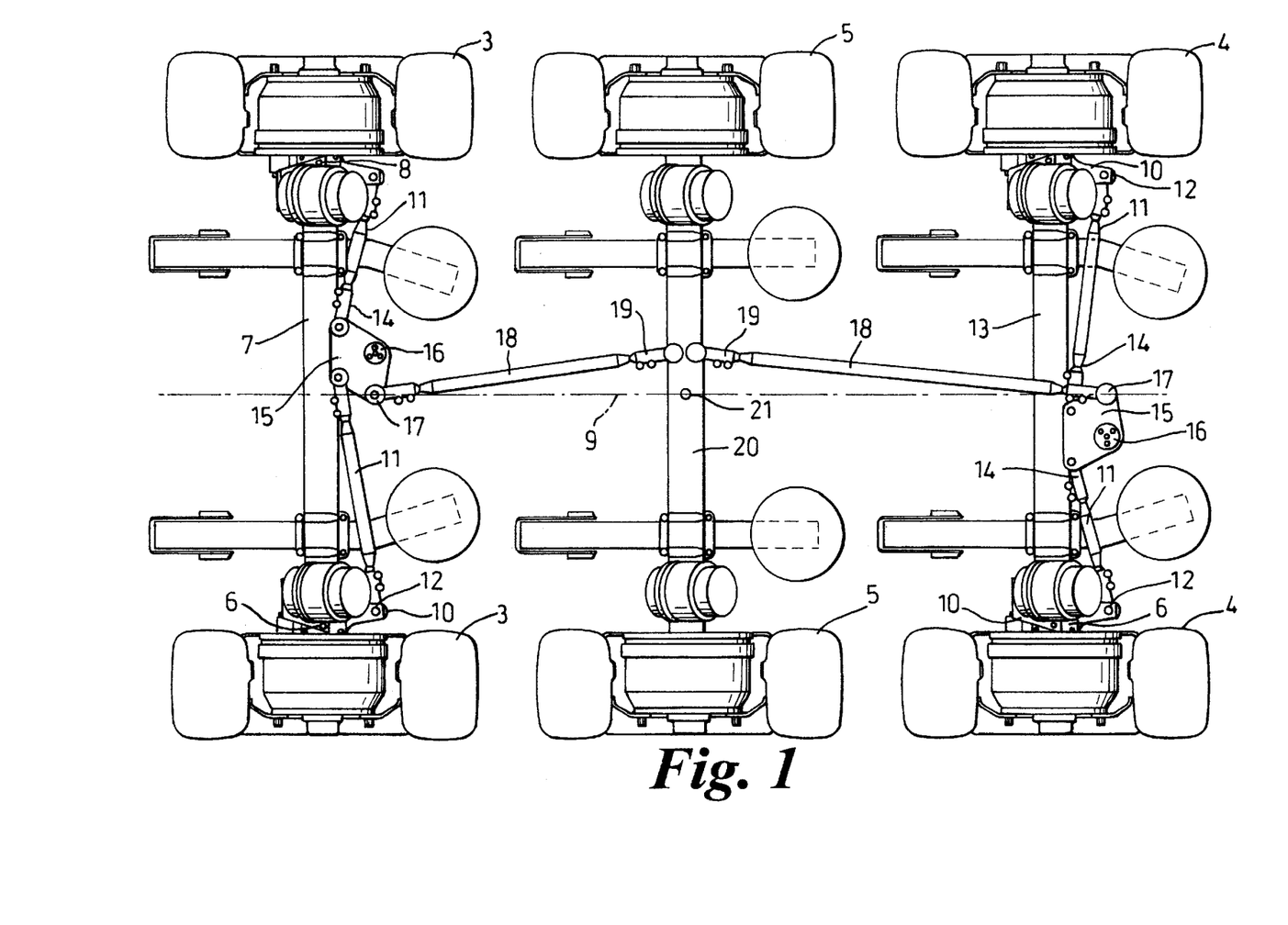
FIG. 1 is a plan view of one configuration of the sub-chassis.
Figure 2:
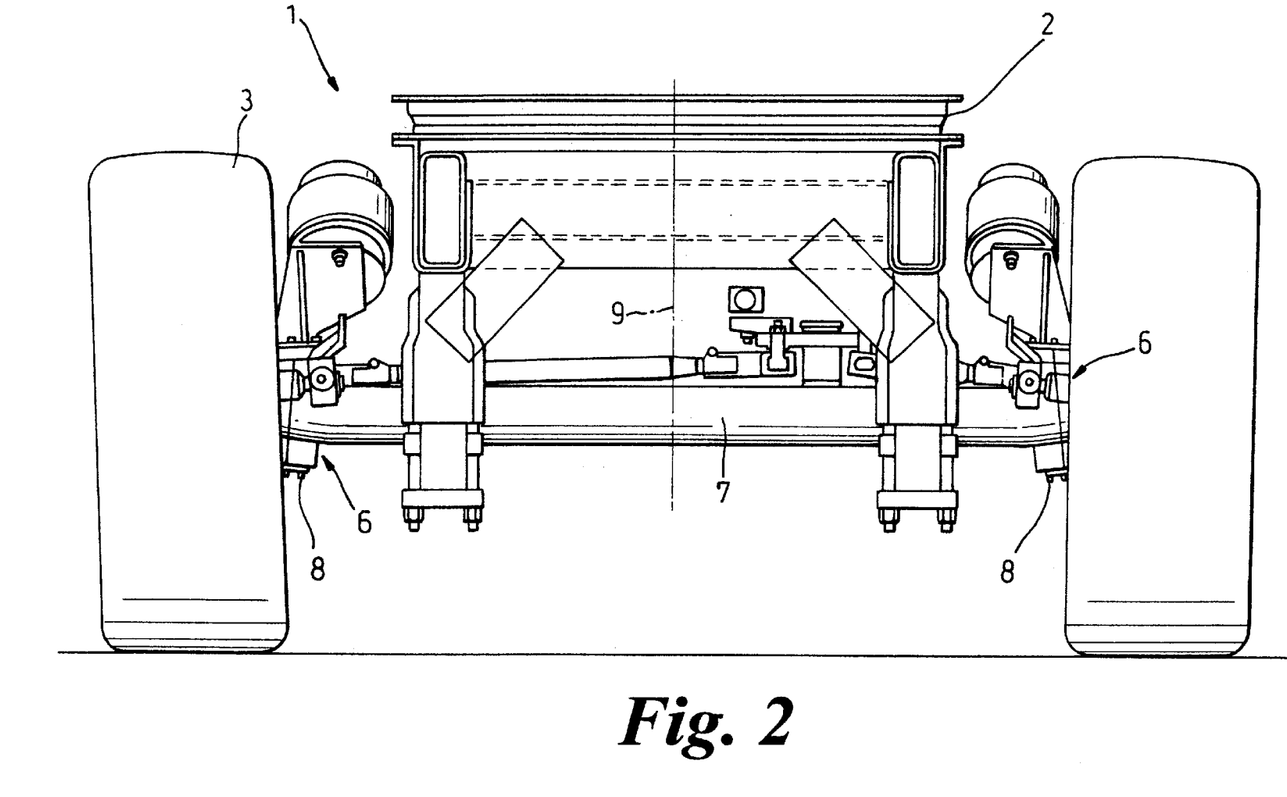
FIG. 2 is a front view of the sub-chassis.
Figure 3:
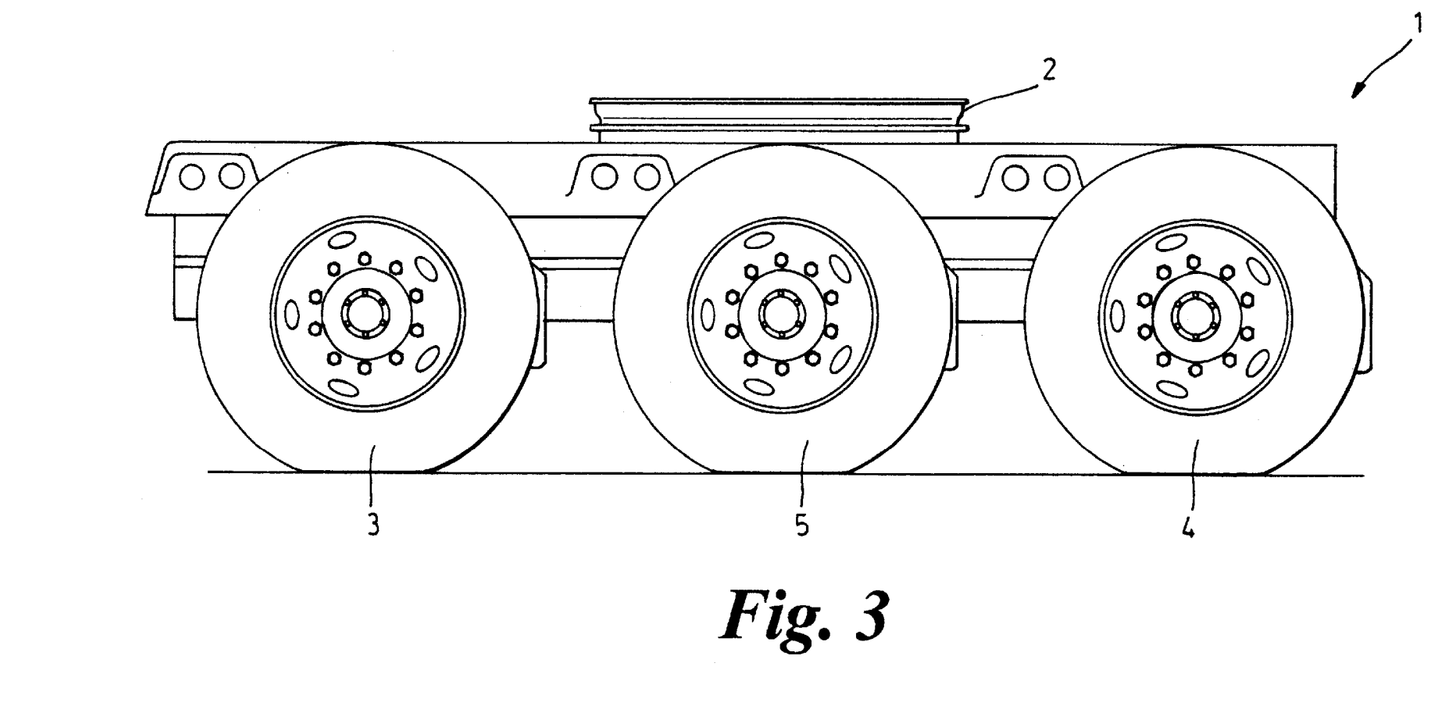
FIG. 3 is a side view of the sub-chassis.

The trailer shown in FIGS. 1–3 comprises a main chassis (not shown) and a sub-chassis generally indicated at 1 relative to which the main chassis may rotate about a vertical axis. The sub-chassis carries a first part 2 of a turntable, the second part (not shown) being carried by the main chassis. The two parts of the turntable meet at arcuate bearing surfaces. These bearing surfaces may comprise a ball or roller bearing race. Alternatively, where it is preferred to reduce the number of moving parts, the arcuate being surfaces may be formed from a low-friction or composite material, such as ACM. The main chassis has at its forward end a towing link for articulation to a towing vehicle.

The sub-chassis bears the weight of the main chassis, superstructure and any payload. As can be seen from FIG. 1, which illustrates the steering linkage mechanism of the sub-chassis, the sub-chassis includes three pairs of wheels. Of particular interest are the forward pair of wheels 3 and the rear pair of wheels 4, both of which are arranged to be steerable, as will be explained. The middle pair of wheels 5 are static in the sense that they are not steerable independent of the sub-chassis itself. As can be seen from FIGS. 1 and 2, the forward pair of wheels 3 are mounted on respective stub axis and king pin assemblies 6, which allow the wheels to run along the road surface on the one hand and to pivot about substantially vertical axes on the other. This latter pivoting motion allow the wheels to be steered independently of the sub-chassis in the conventional way. The pivot axes will in practice be inclined somewhat to the vertical, to provide optimum steering geometry.

The forward pair of wheels 3 are joined together by a forward cross-member 7 to which the king pins 8 are attached; the stub axles 6 are then free to pivot on the king pins 8. Each stub axle 6 includes a steering arm 10 to which a track rod half 11 is pivotally attached at track rod ends 12. Similarly, the rear pair of wheels 4 are joined together by a rear cross-member 13 to which the king pins about which the stub axles 6 pivot are attached. Again, each stub axle 6 includes a steering arm 10 to which a track rod half 11 is pivotally attached to track rod ends 12.

The innermost ends 14 of each pair of track rod halves 11 are pivotally coupled to either side of a bell crank 15. The bell crank is pivotally mounted on a cross-member of the sub-chassis about a respective pivot point 16 and also carries another pivotal connection 17 to a primary link 18, the purpose of which will be explained below. Suffice it to say, for the time being, that by virtue of the geometry of the bell cranks, if either of the primary links 18 is pushed or pulled, this causes the respective bell crank 15 to rotate about its pivotal mounting 16, 17 to the sub-chassis 1, which in turn causes the respective track rod halves 11 to be pushed or pulled. The effect of this, of course, is to steer the corresponding pair of wheels 3, 4.

Now, the ends 19 of the primary links 18 which are distant from the bell cranks 15 are attached to a steering mounting which depends from the main chassis. For completeness, it should be noted that the centre of the turntable which allows the main chassis to turn relative to the sub-chassis coincides with the centre of the axle 20 on which the middle wheels 5 are mounted. It is shown on FIG. 1 as 21. Thus, rotation of the main chassis relative to the sub-chassis will cause those ends 19 of the primary links 18 to describe a circle, relative to the sub-chassis, centred on this point 21. The result is that, as required, one primary link will be pushed and the other pulled, causing both the forward and rear pairs of wheels to steer.

Before going on to illustrate the steering mechanism with reference to FIG. 5, reference will now be made to FIG. 4, which shows a front view of the steering mounting 22 which depends from the main chassis. This mounting 22 depends from the centre of the turntable on the main chassis and indeed the axis of the turntable centre is again identified at 21. The steering mounting 22 is a simple device. It consists of an upper bracket 23 which is attached to the main chassis. An extension 24 of the upper bracket 23 can be seen at the lest of FIG. 4, this extension 24 serving as the point of attachment of one end 25 of a hydraulic ram 26.

Depending from the upper bracket 23 are a pair of swinging arms 27, the free ends of which are spanned by a tie 28. The upper and lower ends of the swinging arms 27 are attached to the upper bracket 23 and the tie 28 at respective pivot points 29, 30, the two upper pivot points 29 being equidistant from the axis of the turntable 21. An extension 31 of the tie 28 can be seen at the right of FIG. 4, this extension 31 serving as the point of attachment of the other end of the hydraulic ram 26. In the middle of the tie 28 and able to swivel relative to about a vertical spindle 32 is a pair of clamping collars 33 (not shown), each terminating in a tapered ball joint. Each of these clamping collars receives the end 19 of a respective primary link 18.

Figure 4:
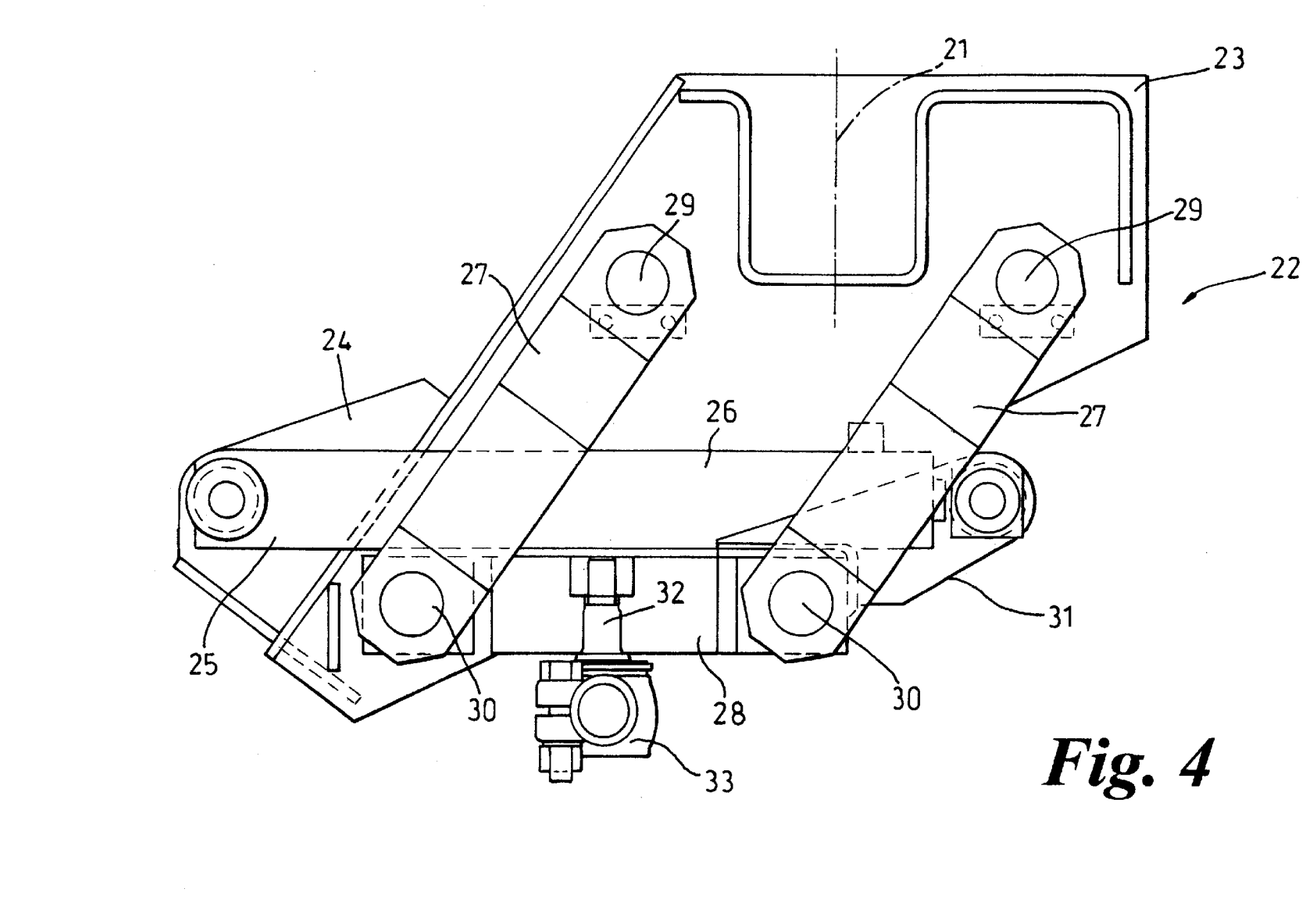
FIG. 4 is a front view of the movable steering mounting.

FIG. 4 shows the hydraulic ram 26 in a retracted condition, in which the swinging arms 27, tie 28 and collar 33 are pulled to left as shown. However, extension of the ram 26 causes the swinging arm 27 to swing to the right, taking the tie 28 and collar 33 with them, past bottom dead centre at which the collar is aligned with the axis 21, to a position at which the collar 33 is as far to the right of the axis 21 as it is to the left of FIG. 4. With reference to FIG. 1, it will be understood that this movement causes the ends 19 of the primary links 18 to cross the median axis 9 of the sub-chassis and lie below that axis as shown. The purpose of this movement is to switch the direction in which the wheels 3, 4 steer for any given relative movement between the main chassis and the sub-chassis. This is very important in allowing the trailer to be backed up.

Figure 5A:
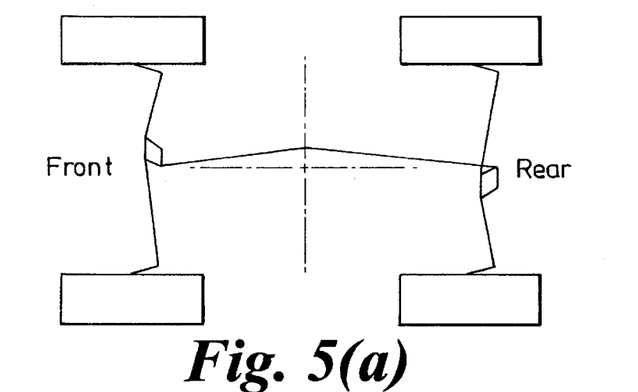
FIG. 5 is a schematic illustrating various steering movements of the sub-chassis wheels.

As explained, the operation of the steering system is straightforward. Consider a counter-clockwise turn, as in FIG. 5(b) as compared with a straight-on configuration as shown in FIG. 5(a). Turning of the main chassis (median axis 34) relative to the sub-chassis (median axis 9) about axis 21 causes relative pivotal motion between the upper and lower parts of the turntable. As the upper part of the turntable pivots with respect to the lower part, clamping collars 33 (not shown) are rotated in the direction of arrows 100 the rear primary link is pulled from right to left as illustrated and the rear wheels 4 are rotated clockwise by rear primary link 18, bell crank 15, track rod halves 11 and steering arms 10. Rotation occurs automatically by means of the linkage system from the steering mounting 22 (not shown) to the rear wheels 4. Movement of the rear primary link 18 will cause the rear bell crank 15 to rotate counter-clockwise. This in turn causes downward movement of rear track rod halves 11. The motion of the rear track rod halves 11 is transferred through the steering arms 10 to cause clockwise rotation of the rear wheels 4.

Figure 5B:
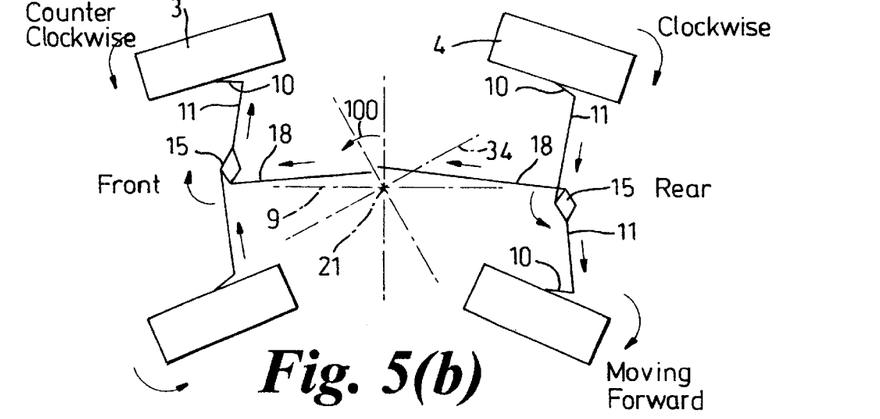

The position is similar for the forward pair of wheels 3. As the upper part of the turntable pivots with respect to the lower part in the direction of arrow 100, forward wheels 3 are rotated counter-clockwise by the front primary link 18, bell crank 15, track rod halves 11 and steering arms 10. Again, rotation occurs automatically by means of the linkage system from the steering mounting 22 to the forward wheels 3. For a counter-clockwise turn, rotation of clamping collar 33 (not shown), to which ends 19 of primary link 18 are fixed, causes movement of the primary link 18 from right to left and bell crank 15 to rotate clockwise. This in turn causes upward movement of track road halves 11. The motion of the track rod halves 10 is transferred through the steering arms 10 to cause counter-clockwise rotation of the forward wheels 3.

Thus, with a very simple system of linkages the forward and rear wheels can be steered into the optimum position for following the towing vehicle. This minimizes wear and tear on the tires and stress to the main chassis and sub-chassis. The degree of steer of the front rear wheels in forward and reverse can be varied by the amount of movement of the primary links to either side of the centre line.

Figure 5C:
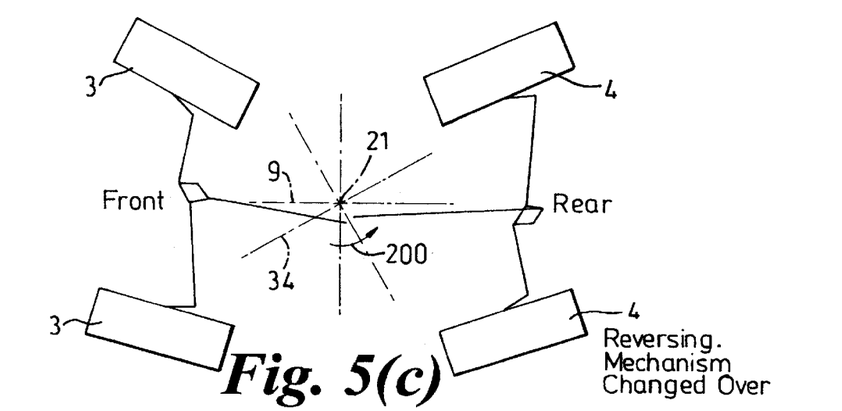

The situation is somewhat different when the hydraulic ram 26 is activated to switch the clamping collars 33 across to the other side of the axis 21 of the turntable as shown in FIG. 5(c). For the same degree of relative rotation of the main chassis and sub-chassis, the forward and rear wheels now turn in senses opposite to those in FIG. 5(b). This is desirable as it will prevent the trailer from jack-knifing in a reverse turn and will tend to straighten the whole vehicle out once the tractor unit straightens out, i.e. stops turning. Thus, it can be seen that this arrangement allows both sets of wheels to be switched between forward and reverse steering using just a single moveable steering mounting on the main chassis and a single double-acting ram, a pair of air bellows or a worm drive.

Figure 6:
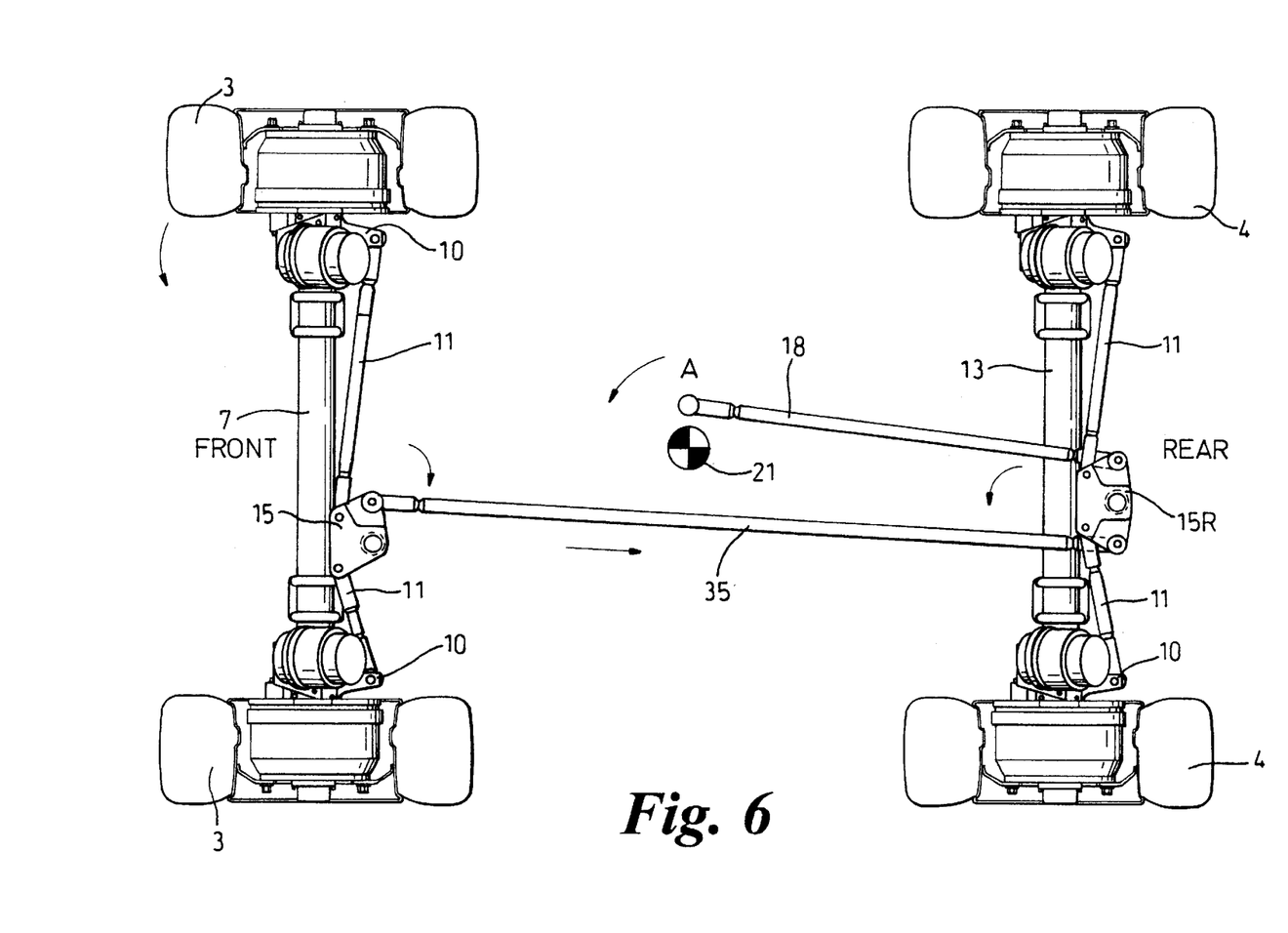
FIG. 6 is a plan view of an alternative configuration of sub-chassis.

FIG. 6 shows a different linkage configuration from that shown in FIG. 1. Instead of two primary links 18, there is just the one. Consequently, there is one clamping collar on the horizontal tie 28 of the steering mounting 22. In addition, a secondary link 35 attaches at one end to one bell clamp 15 and at the other end to the other bell clamp 15. In this arrangement, the rear wheels 4 are steered in exactly the same way as in FIG. 1. The difference is in the steering of the forward wheels 3.

Link 35 between the rear bell crank 15R and the forward bell crank 15 allows the forward wheels 3 to rotate in an opposite sense to the rear wheel 4. During a counter-clockwise turn, movement of the steering arm 18 rotates the rear bell crank 15R counter-clockwise. This causes the secondary link 35 to move to the right as shown, rotating the forward bell crank 15 clockwise. This in turn moves the forward track rod halves 11 upwards. This motion is translated through the steering arms 10 into counter-clockwise rotation of forward wheels 3.

Figure 7:
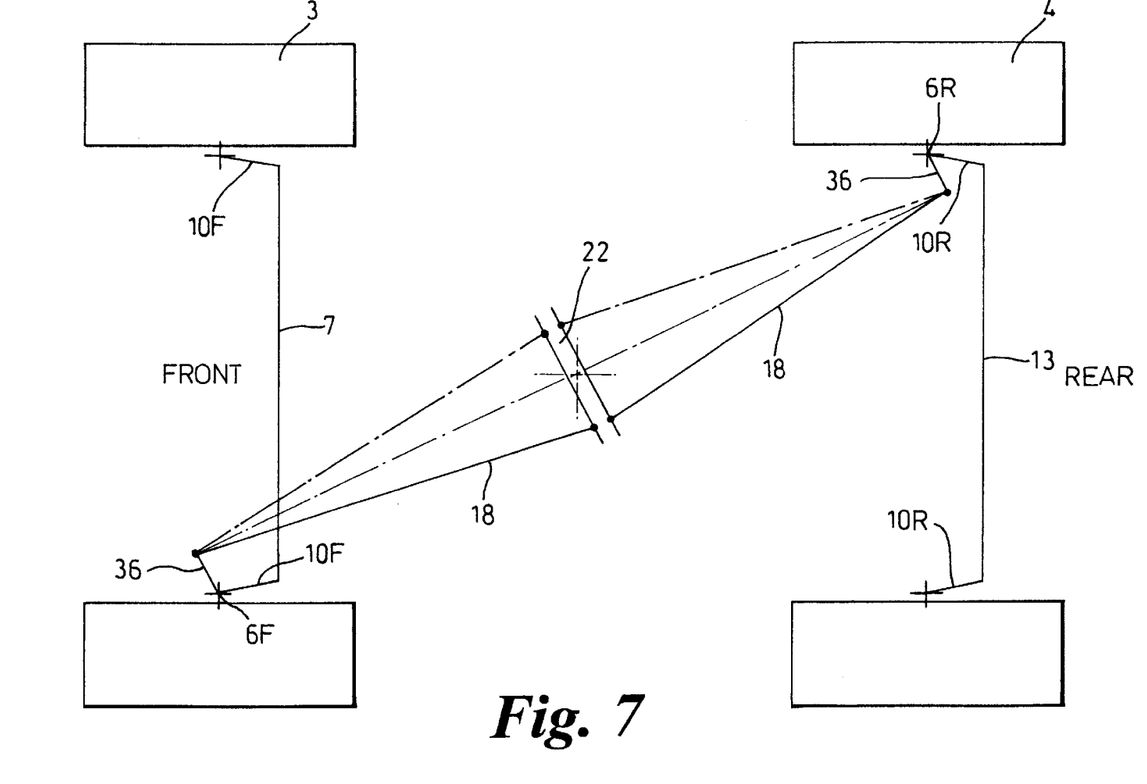
FIGS. 7 and 8 are schematic illustrations of different sub-chassis configurations.

FIG. 7 shows an arrangement of linkages which differs from those of the previous examples in not making use of bell cranks. Instead, the forward steering arms 10F are connected to one another by a one-piece track rod 7 and the rear steering arms 10R are similarly connected by a one-piece track rod 13. Two primary links 18 are provided, each linking the steering mounting directly to a supplementary steering arm 36 on a forward or rear stub axle 6F, 6R respectively. Operation of the hydraulic ram to move the steering mounting is the same as in the previous example, except that the steering mounting now lies at an angle to the main chassis.

Figure 8:
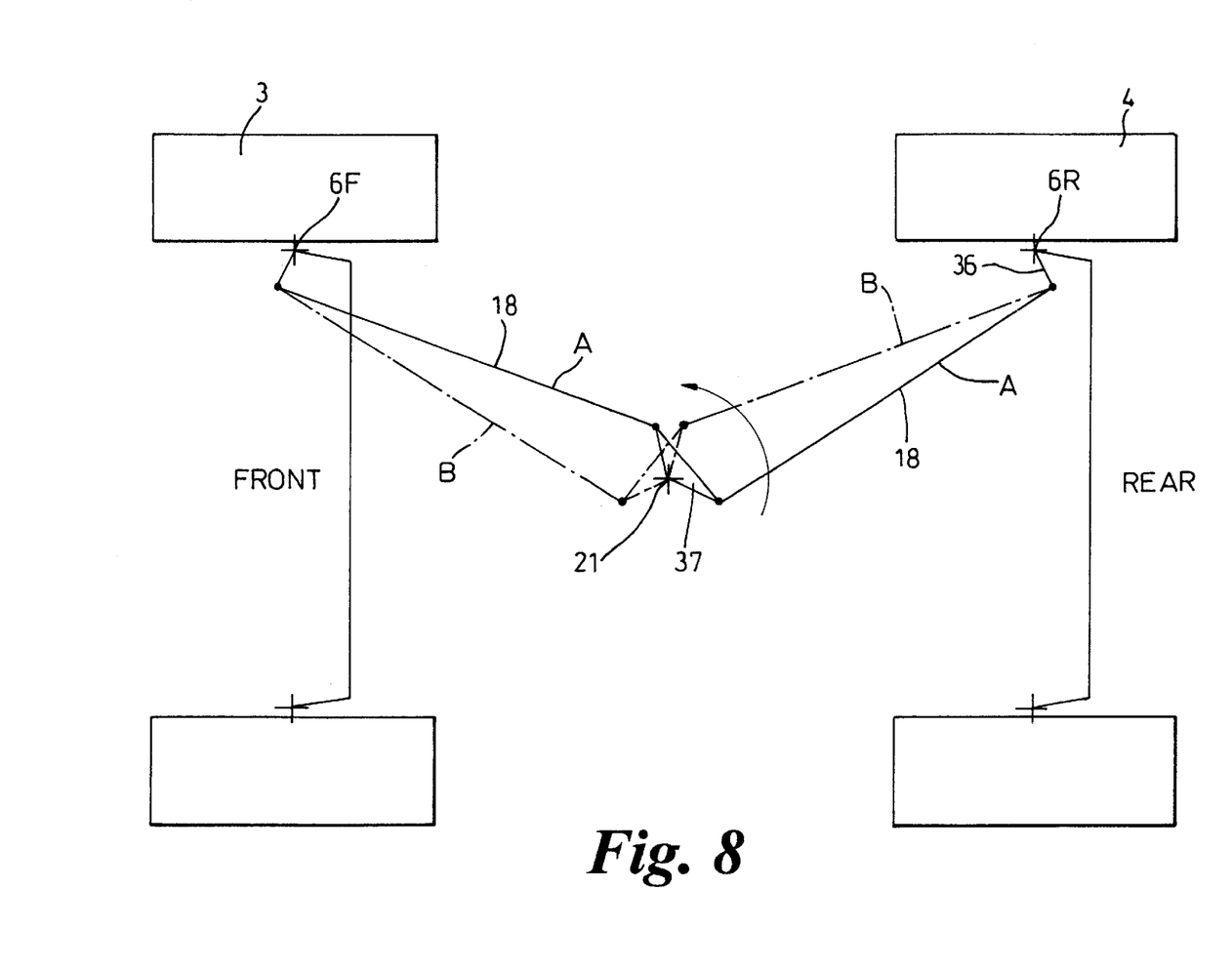
Figure 9:
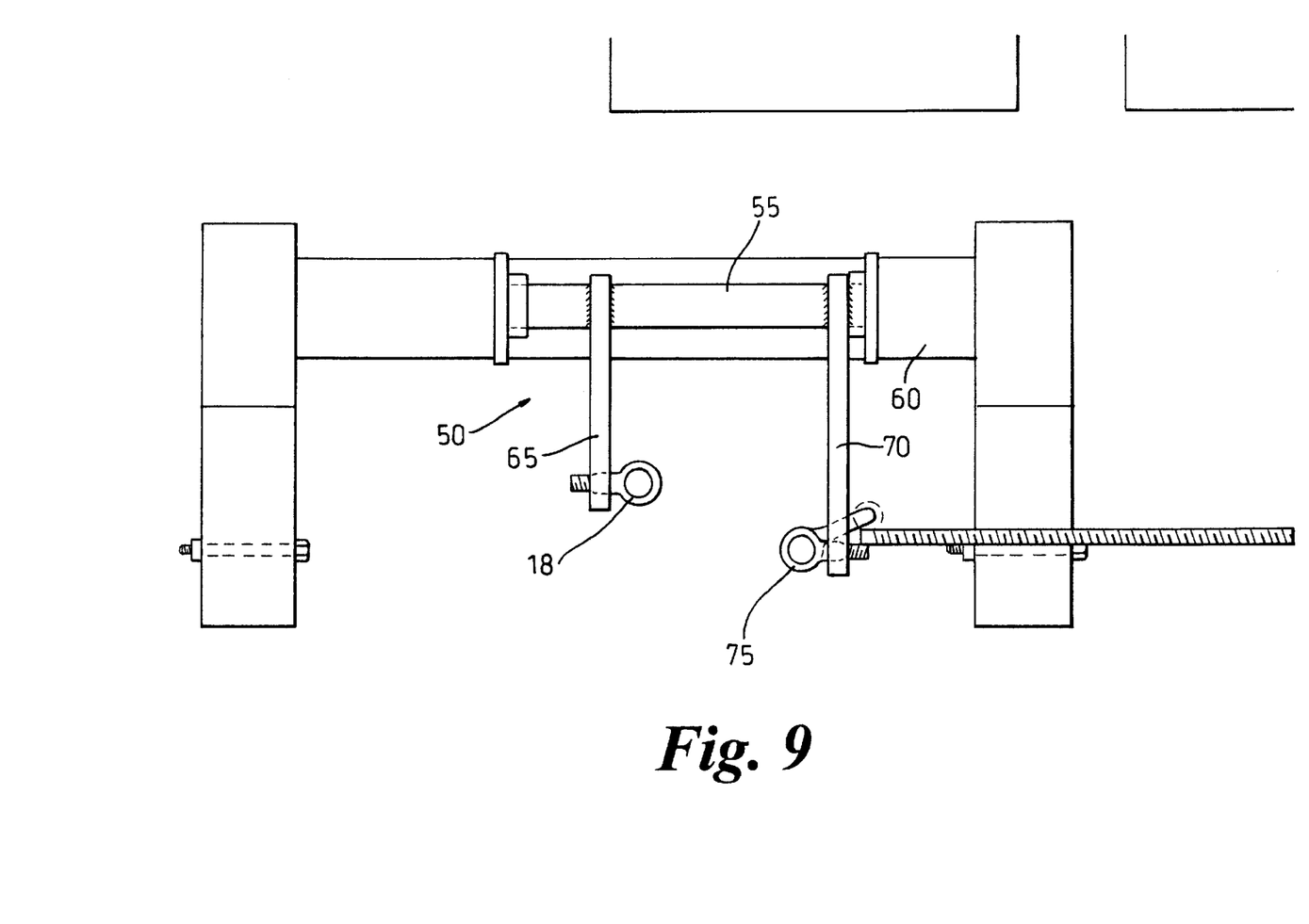
FIGS. 9–12 are different perspectives of an alternative sub-chassis arrangement.
Figure 10:
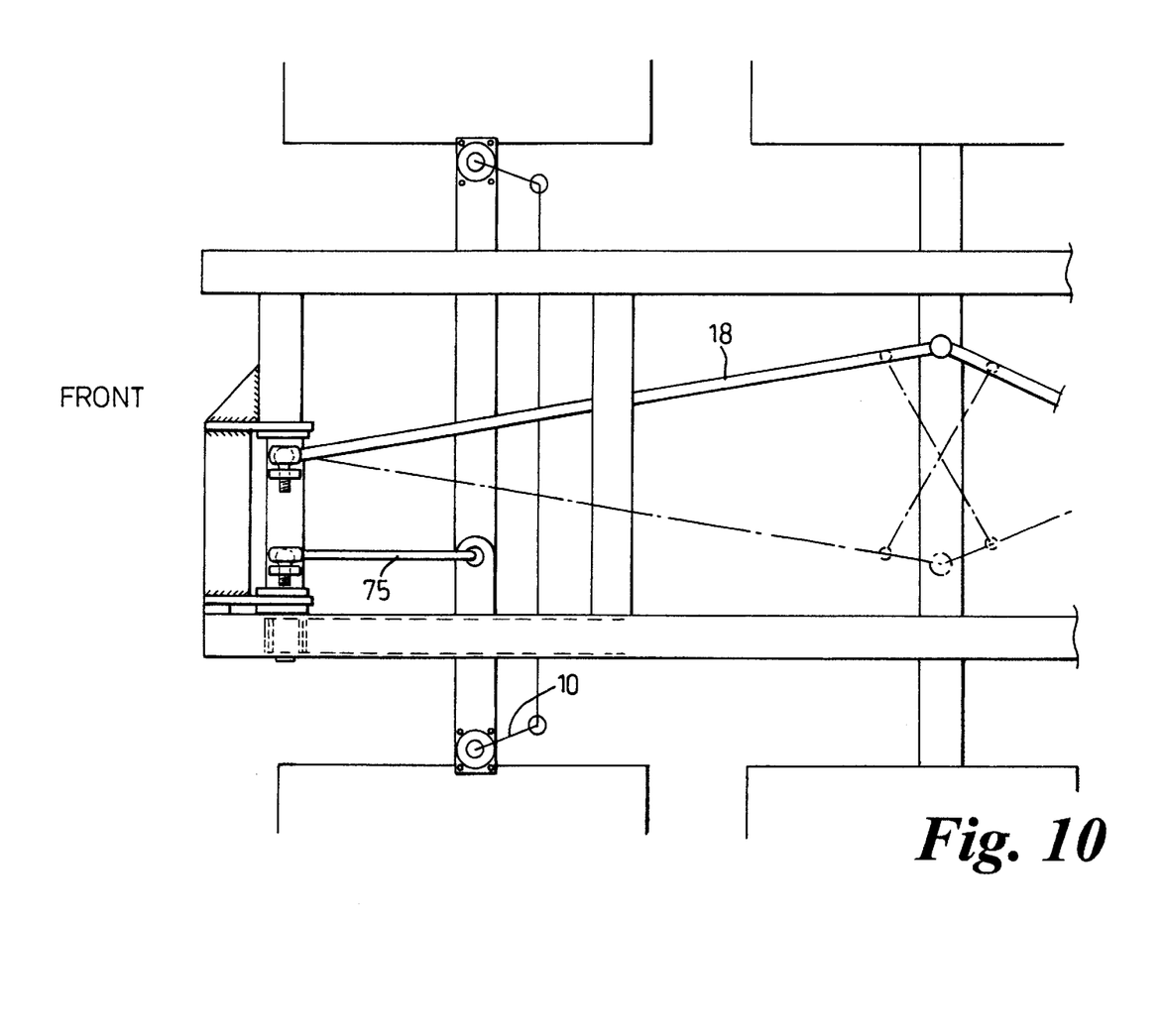
Figure 11:
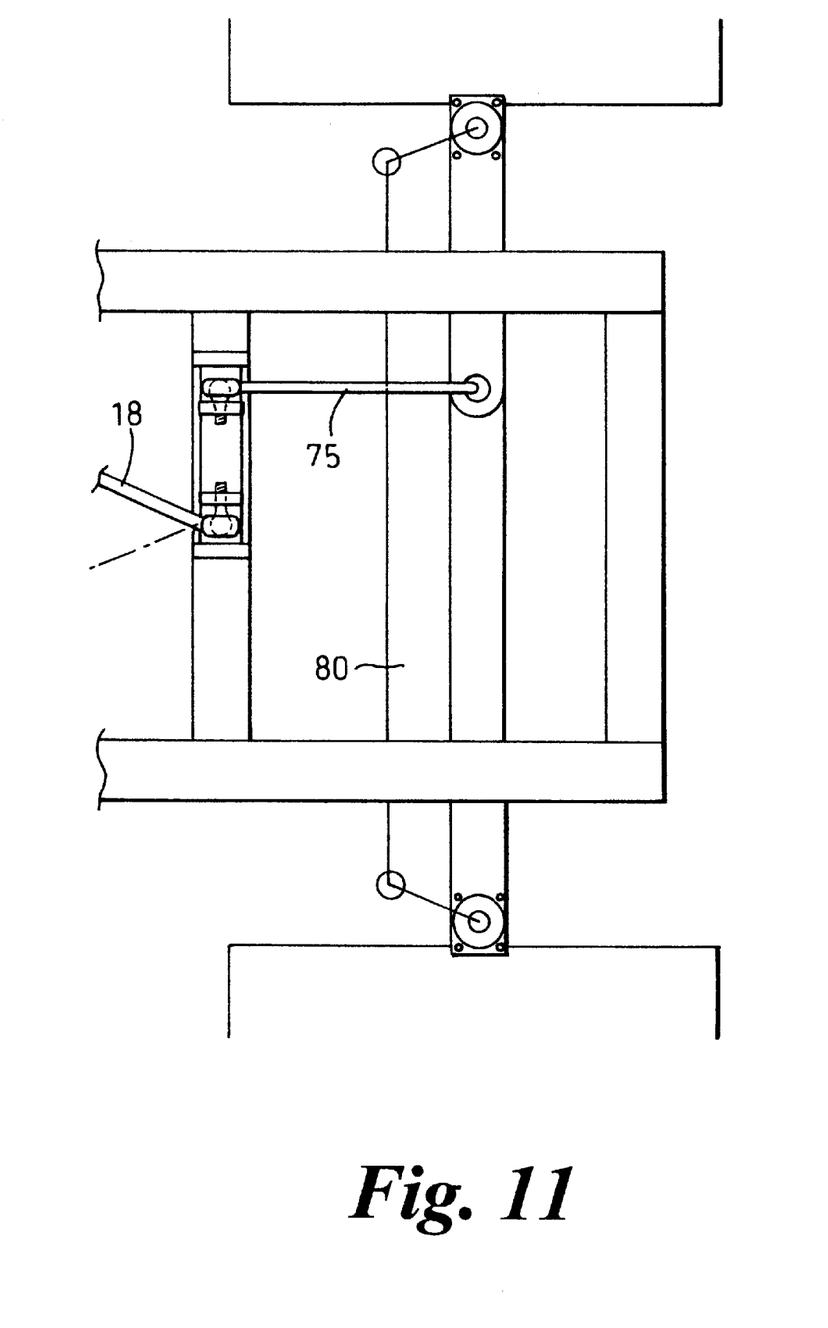
Figure 12:
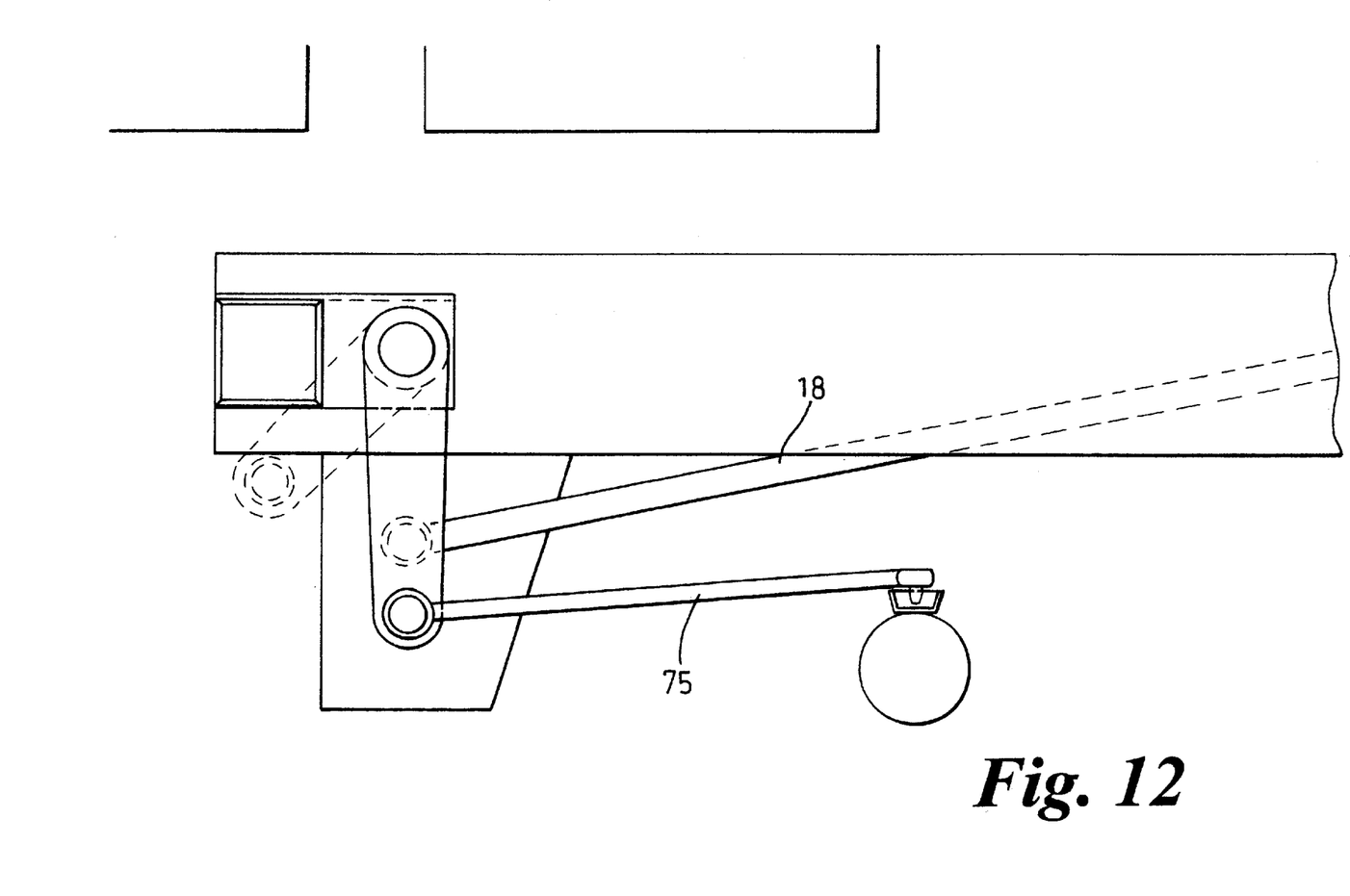

FIG. 8 is yet another configuration, similar to FIG. 7, except that the steering mounting of FIG. 7 with its linear motion has been replaced by a rotary steering mounting. Such a steering mounting may be a crank 37 which rotates about the axis 21 of the turntable. Two primary links 18 are provided which connect this crank 37 to a supplementary steering arm of forward and rear stub axles 6F, 6R respectively. The arrangement is such that the angle between the primary link 18 and the line which joins its supplementary steering arm 36 to the axis of the turntable is the same for each. Furthermore, when the crank rotates form position A in FIG. 8 to position B (dotted line) this angle remains the same in magnitude, but reverses in sign.

The net effect of this, of course, is again to switch the direction of rotation of the wheels 3, 4 for any given relative rotation of the main chassis and the sub-chassis, since movement of the crank from position A to position B results in the line of action of each of the primary links 18 crossing a radius of the turntable. This in turn means that what in position A pulls on a primary link 18 pushes on it in position B and vice versa.

FIGS. 9–12 also show an arrangement of linkages which differs from those of previous examples in not making use of a bell crank. Taking FIGS. 9 and 10 as a starting point, steering motion is transferred up a primary link 18 (as previously described) via a first arm 65 to a horizontal shaft 55. It is then transferred through the horizontal shaft 55 to the second arm 70. The second arm 70, in turn, transfers the motion to steering rod 75, which transfers it to the steering arm 10. The motion is then transferred through a full track rod 80 (for which see FIG. 11) to cause the front/rear pair of wheels to rotate.

What is claimed is:

1. A trailer comprising:
   a main chassis adapted to be articulated to a tractor unit;
   a sub-chassis (1) relative to which the main chassis may rotate about a substantially vertical axis and including a laterally spaced pair of forward steerable wheels (3) and a laterally spaced pair of rear steerable wheels (4), each sub wheel being pivotable relative to the sub-chassis (1) about a respective substantially vertical axis; and
   a linkage mechanism coupling each of the steerable wheels (3,4) to a steering mounting (22) on the main chassis such that rotation of the main chassis relative to the sub-chassis (1) causes the wheels to pivot about their respective axes and including at least one primary link (18) having first and second ends, the first end being coupled to the steering mounting (22);
   wherein the steering mounting (22) is movable relative to the main chassis between a first position and a second position such that said motion causes a line of action joining the first and second ends of each primary link (18) to cross the axis (21) about which the main chassis rotates relative to the sub-chassis (1).

2. A trailer according to claim 1 in which each such steerable wheel rotates on a stub axle assembly adapted to pivot relative to the sub-chassis.

3. A trailer according to claim 2 in which each such stub axle assembly is pivotable relative to a king pin carried by the sub-chassis.

4. A trailer according to claim 1 in which each such steerable wheel is associated with a steering arm which pivots with the wheel relative to the sub-chassis and the steering arms of each pair of wheels are linked by a track rod.

5. A trailer according to claim 2 in which each such stub axle assembly includes a steering arm and the steering arms of each pair of sub axle assemblies are linked by a track rod.

6. A trailer according to claim 1 in which at least one such primary link couples the steering mounting directly to a steering arm which pivots with a respective wheel relative to the sub-chassis.

7. A trailer according to claim 4 in which at least one such primary link couples the steering mounting directly to an intermediate coupling of a respective pair of wheels or stub axle assemblies, the track rod of that pair of wheels or stub axle assemblies being in two parts, each part connecting a respective steering arm to the intermediate coupling.

8. A trailer according to claim 7 in which each track rod part has a first and second end and a line of action joining said first and second end and the intermediate coupling is a bell crank mounted on the sub-chassis at a pivot point, with the lines of action of the primary link and of the track rod parts being offset from the pivot point.

9. A trailer according to claim 6 in which the linkage mechanism includes one primary link and a second link coupling a steering arm or intermediate coupling of the pair of wheels or stub axle assemblies to which the primary link is coupled to a steering arm or intermediate coupling of the other pair of wheels or stub axle assemblies.

10. A trailer according to claim 6 in which the linkage mechanism includes a primary link for each pair of wheels or stub axle assemblies.

11. A trailer according to claim 1 in which the movement of the steering mounting is in a vertical plain.

12. A trailer according to claim 11 in which the movement of the steering mounting is substantially horizontal.

13. A trailer according to claim 11 in which the movement of the steering mounting is substantially perpendicular to the line of action of each primary link.

14. A trailer according to claim 11 in which the steering mounting comprises a swinging arm depending from the main chassis, each primary link being coupled to the swinging arm.

15. A trailer according to claim 14 in which the steering mounting comprises two swinging arms depending from the main chassis, joined at their free ends by a horizontal tie to form a parallelogram, each primary link being coupled directly to the horizontal tie.

16. A trailer according to claim 1 in which the movement of the steering mounting is in a horizontal plane.

17. A trailer according to claim 16 in which the movement of the steering mounting is rotary.

18. A trailer according to claim 1 in which the steering mounting comprises a crank mounted on the main chassis at a pivot point and to which each primary link is directly coupled.

19. A trailer according to claim 1 comprising a single telescopic ram for moving the steering mounting between its first and second positions.

20. A trailer according to claim 1 in which the main chassis and the sub-chassis have cooperating arcuate bearing surfaces which permit their relative rotation.

21. A trailer according to claim 20 in which the arcuate bearing surfaces are comprised of two halves of a turntable.

* * * * *